Jan. 4, 1955
E. K. P. GRAHAM
2,698,732
POWER TRANSMISSION DEVICE FOR HOISTS
Filed Dec. 22, 1948
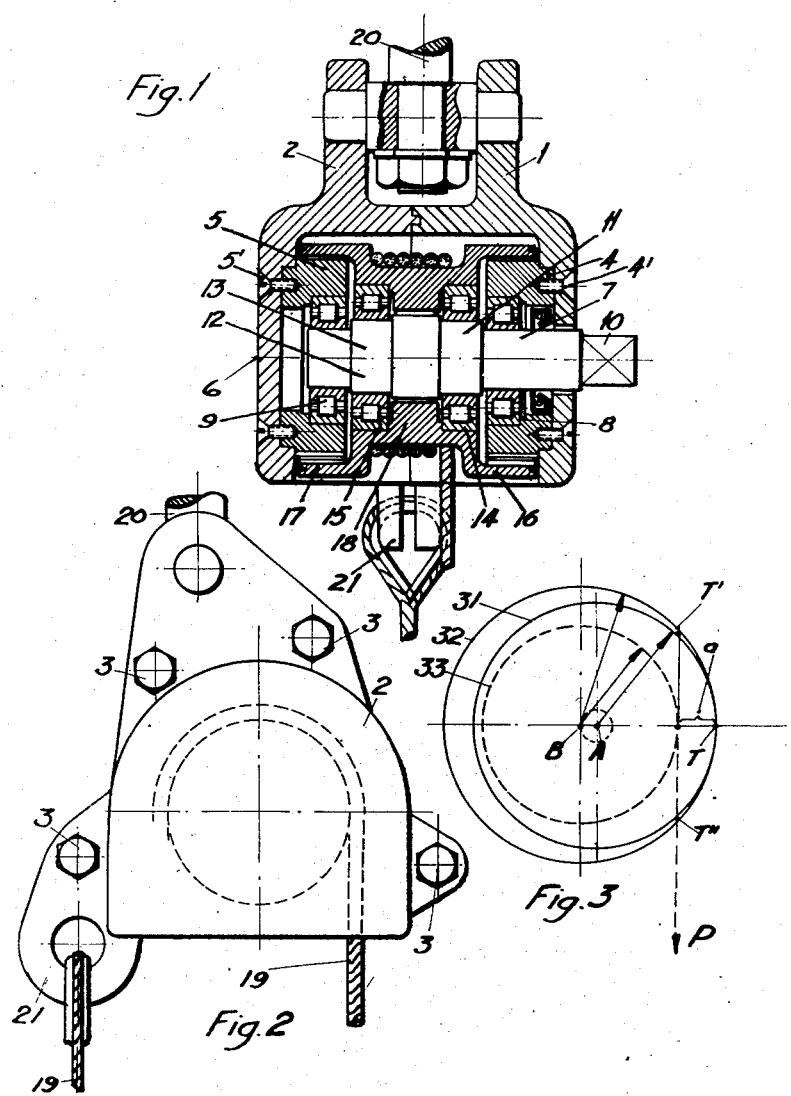
Inventor:
Edward Knut Patrick Graham
by Jarvis C. Marble
his attorney

United States Patent Office 2,698,732
Patented Jan. 4, 1955

2,698,732

POWER TRANSMISSION DEVICE FOR HOISTS

Edward K. P. Graham, Stockholm, Sweden

Application December 22, 1948, Serial No. 66,787

2 Claims. (Cl. 254—171)

The present invention relates to a power transmission device and has particular utility in connection with the hand-operated type of hoist, although it may be advantageously embodied in other devices.

An object of the invention is to provide a device in which a driven part is self-blocking on certain occasions without increasing the power which is necessary for driving the device or special elements as latch and ratchet.

Another object is to provide a device with a considerably large revolution reduction with few gears, so that a heavy load may be moved with little power.

Still another object of the invention is to provide a hoist which is formed of relatively few parts which can be cheaply manufactured.

The more detailed nature of this invention and the manner in which it is carried out will be best understood from a consideration of the ensuing portion of this specification taken in connection with the accompanying drawings forming part hereof, in which:

Fig. 1 is a vertical section of a hoist;
Fig. 2 is a side elevation of the hoist; and
Fig. 3 is a diagrammatical view of the hoist for the purpose of illustrating its function.

In Figs. 1 and 2 of the drawings, a casing is shown, consisting of two halves 1 and 2 connected with one another by the bolts 3. Two cylindrical gears 4 and 5 with external teeth and a common axis 6 are fixed within the casing by means of screws 4' and 5'. A shaft 7, having a common axis with axis 6, is journalled in the gears 4, 5 by means of roller bearings 8 and 9. Only one end of the shaft 7 projects outside the casing 1, 2 and this end is provided with a square 10. The shaft 7 is provided with two eccentrics 11 and 12 with a common centre axis 13. On each eccentric 11, 12 a roller bearing 14 and 15 is mounted. The roller bearings 14, 15 also carry a pair of gears 16, 17 with internal teeth and a drum 18 with a wire 19. Means other than gear teeth can be employed for causing one wheel to turn the other. The gears 16 and 17 and the drum 18 are concentric with the eccentrics 11, 12 and these gears have such a diameter that they in one point mesh with the first mentioned gears 4, 5. A hook 20, only partly shown, is mounted in the casing 1, 2 and one end of the wire 19 is anchored to an eye 21 on the casing.

When turning the shaft 7, its eccentrics 11, 12 cause the gears 16, 17 to roll along the gears 4, 5 so that the gears 16, 17 during each revolution of the shaft will be moved in relation to the gears 4, 5 a distance equal to the difference between the circumferences of the gears. As this difference can be made extremely small it is possible to obtain a high gear ratio. Further, as the gears 16, 17 are attached to the drum 18, this drum also will turn a small angle for each revolution of the shaft 7 so that an enlarged pulling force will be obtained in the wire 19.

The appearance of self-blocking in the device will be more particularly described with reference to Fig. 3. In this diagrammatical figure, the gears and the drum are indicated as circles. Number 31 represents a stationary gear with its centre A and corresponds to the above mentioned gear 4. 32 represents an eccentrically journalled gear with its centre B and corresponds to the above mentioned gear 16. 33 represents the drum attached to the gear 32 and with a centre B and a hanging load P. T is the tangent point between the gears 31 and 32.

If the driving force should cease while the parts of the device have the positions shown in Fig. 3, the load P with the arm or lever tends to swing the gear 32 downwardly around the tangent point T. Consequently the centre of the gear will move downwardly and the tangent point moves upwardly until, approximately at the point T', it is in line with the load P and the lever a has reached zero value. The turning moment caused by the load thus ceases and the parts of the device will remain in stable equilibrium and consequently the device is self-blocking in this position. Also approximately at the point T", the lever will have zero value and the turning movement will have ceased, but the equilibrium is unstable, as is easily understood. If the contact occurs to the left of the load P in Fig. 3 a turning moment is caused and causes such swinging of the gear 32 that the contact point will come to the position T', where self-blocking occurs.

If the drum 31 has the same diameter as the gear 33, or properly the diameter of the pitch circle of this gear, the direction of the load P passes through the point P and the lever has zero value, while the gear 32 has the position shown in Fig. 3. Accordingly, self-blocking occurs in this position. On the other hand, if the drum 33 has a larger diameter than the pitch diameter of the gear, the power direction of the load in any position will be at a certain distance from the contact point so that the lever and consequently the turning moment always would be available. No self-blocking would occur in such an embodiment of the design.

The symmetrical arrangement of the pairs of gears 4, 16 and 5, 17 is preferred for obtaining more even load on the shaft and bearings, but obviously one of these pairs could be omitted.

While a preferred example of apparatus embodying the principles of the invention has been disclosed herein, it will be understood that other specific designs may be employed without departing from such principles, and the invention is to be deemed to include all forms of apparatus falling within the scope of the appended claims.

What is claimed is:

1. A power transmission device comprising a casing, a drive shaft, two axially spaced gears fixed to said casing and having external teeth concentric with the axis of said shaft, two gears eccentrically journalled on said shaft and having internal teeth meshing with the teeth of the first mentioned gears, and a drum having the same or smaller diameter than said eccentrically journalled gears disposed between and connected to said eccentrically journalled gears.

2. A power transmission device for moving loads having a casing, a stationary gear fixed in the casing, a second gear eccentrically rotatable with respect to said stationary gear and in mesh with said stationary gear, a drum secured to said second gear, said drum having the same or smaller diameter than said second gear, a wire wound around said drum and means for attaching the load to be moved to said casing.

References Cited in the file of this patent

UNITED STATES PATENTS

| Number | Name | Date |
|---|---|---|
| 70,122 | Rochow | Oct. 22, 1869 |
| 185,060 | Arnold | Dec. 5, 1876 |
| 317,728 | Christie | May 12, 1885 |
| 676,994 | O'Keefe | June 25, 1901 |
| 914,582 | Kuehne | Mar. 9, 1909 |
| 955,458 | Hampton | Apr. 19, 1910 |
| 960,501 | Calson | June 7, 1910 |
| 980,220 | Eastman | Jan. 3, 1911 |
| 1,410,016 | Johnson | Mar. 21, 1922 |
| 1,560,161 | Hopkins | Nov. 3, 1925 |
| 1,561,021 | Quick | Nov. 10, 1925 |
| 2,203,453 | Bond | June 4, 1940 |
| 2,495,804 | Berchtold | Jan. 31, 1950 |
| 2,508,187 | Niemiec | May 16, 1950 |